US008230087B2

(12) United States Patent
Alve

(10) Patent No.: US 8,230,087 B2
(45) Date of Patent: Jul. 24, 2012

(54) ENFORCING GEOGRAPHIC CONSTRAINTS IN CONTENT DISTRIBUTION

(75) Inventor: Jukka Alve, Vantaa (FI)

(73) Assignee: Nokia Corporation (FI)

( * ) Notice: Subject to any disclaimer, the term of this patent is extended or adjusted under 35 U.S.C. 154(b) by 519 days.

(21) Appl. No.: 11/766,403

(22) Filed: Jun. 21, 2007

(65) Prior Publication Data

US 2008/0022003 A1    Jan. 24, 2008

Related U.S. Application Data

(60) Provisional application No. 60/815,567, filed on Jun. 22, 2006.

(51) Int. Cl.
    *G06F 15/16*      (2006.01)
(52) U.S. Cl. ..................... 709/229; 455/411
(58) Field of Classification Search .............. 455/411; 709/229
See application file for complete search history.

(56) References Cited

U.S. PATENT DOCUMENTS

| | | | | |
|---|---|---|---|---|
| 6,009,166 A * | 12/1999 | Polito et al. | ............ | 379/422 |
| 6,108,365 A * | 8/2000 | Rubin et al. | ............ | 375/130 |
| 6,169,498 B1 * | 1/2001 | King et al. | ............ | 340/686.1 |
| 6,215,441 B1 * | 4/2001 | Moeglein et al. | ...... | 342/357.01 |
| 6,269,446 B1 * | 7/2001 | Schumacher et al. | ...... | 713/176 |
| 6,441,752 B1 * | 8/2002 | Fomukong | ............ | 340/988 |
| 6,650,288 B1 * | 11/2003 | Pitt et al. | ............ | 342/357.15 |
| 6,978,023 B2 * | 12/2005 | Dacosta | ............ | 380/258 |
| 7,035,652 B1 * | 4/2006 | Kelkar | ............ | 455/456.6 |
| 7,730,184 B2 * | 6/2010 | Camp, Jr. | ............ | 709/226 |
| 2001/0048746 A1 * | 12/2001 | Dooley | ............ | 380/258 |
| 2001/0051996 A1 * | 12/2001 | Cooper et al. | ............ | 709/217 |
| 2002/0004399 A1 * | 1/2002 | McDonnell et al. | ...... | 455/456 |
| 2002/0163901 A1 * | 11/2002 | Spratt | ............ | 370/338 |
| 2004/0203869 A1 * | 10/2004 | Annamalai | ............ | 455/456.1 |
| 2005/0234735 A1 * | 10/2005 | Williams | ............ | 705/1 |
| 2005/0273708 A1 * | 12/2005 | Motyka et al. | ............ | 715/515 |
| 2006/0059096 A1 | 3/2006 | Dublish et al. | | |

FOREIGN PATENT DOCUMENTS

| | | |
|---|---|---|
| EP | 1605665 | 12/2005 |
| WO | 2005057846 | 6/2005 |

OTHER PUBLICATIONS

International Preliminary Report on Patentability for International Application No. PCT/IB2007/001688 mailed Jan. 8, 2009, 6 pages.
International Search Report for International Application No. PCT/IB2007/001688 mailed Jan. 18, 2008, 4 pages.

* cited by examiner

*Primary Examiner* — Thomas Dailey
(74) *Attorney, Agent, or Firm* — Banner & Witcoff, Ltd.

(57) ABSTRACT

Enforcement of geographic and location based constraints on content distribution is provided to allow distribution of content to remote devices while preventing unauthorized use and consumption of the content. Content requested by a device may be protected using a variety of content protection mechanisms that support geographic constraints. The requesting device may be required to validate and/or obtain the device's physical location prior to being granted access to the protected content. The requesting device may validate and/or obtain its physical location by requesting location information from a location server or another geographic aware device. The distribution of the location information from the location server may be limited to a predefined proximity. The proximity limit on the dissemination of the location information prevents remote devices from fraudulently using the location information. Location information may be encapsulated and may be formatted as a content file.

31 Claims, 12 Drawing Sheets

| Geographic_Location_Format | Format of "geographic location" | Size |
|---|---|---|
| 0 ("Country Codes") | ISO 3166-1-alpha-2 country codes, encoded as a string of 8-bit ASCII characters | 2 bytes |
| 1 ("2-D positioning") | Latitude (24 bsmsbf) {±dddddddd:mmmmmm:ssssss.sss}<br><br>{msb → 0 = +; 1 = -}<br><br>{8 bit "degree field" → 0 – 180; 181-255 reserved}<br><br>{6 bit "minute field" → 0 – 59; 60-63 reserved}<br><br>{6 bit "second field" → 0 – 59; 60-63 reserved}<br><br>{3 bit "second fraction field" → integer number of 1/8 seconds}<br><br>Longitude (24 bsmsbf) {±dddddddd:mmmmmm:ssssss.sss} | 6 bytes |
| 2 ("3-D positioning") | Latitude (24 bsmsbf) {±dddddddd:mmmmmm:ssssss.sss}<br><br>{msb → 0 = +; 1 = -}<br><br>{8 bit "degree field" → 0 – 180; 181-255 reserved}<br><br>{6 bit "minute field" → 0 – 59; 60-63 reserved}<br><br>{6 bit "second field" → 0 – 59; 60-63 reserved}<br><br>{3 bit "second fraction field" → integer number of 1/8 seconds}<br><br>Longitude (24 bsmsbf) {±dddddddd:mmmmmm:ssssss.sss}<br><br>Elevation (16 bsmsbf) {integer feet above sea level; range 0 to 65535 feet, as high as commercial jets fly} | 8 bytes |
| 3-255 | Reserved. | Dependent on format. |

FIG. 10

ENFORCING GEOGRAPHIC CONSTRAINTS IN CONTENT DISTRIBUTION

CROSS-REFERENCE TO RELATED APPLICATIONS

This application claims the benefit of U.S. Provisional Application No. 60/815,567, filed on Jun. 22, 2006 and entitled "ENFORCING GEOGRAPHIC CONSTRAINTS IN CONTENT DISTRIBUTION," the contents of which are incorporated herein by reference in its entirety.

FIELD OF THE INVENTION

Embodiments of the invention relate generally to a method and a system for enforcing content protection of electronic content.

BACKGROUND OF THE INVENTION

Electronic content delivery has engendered the ability of consumers to request and receive specific content at a desired time and at a desired and/or convenient location. For example, a sports fan may want to watch a soccer game while on travel. With digital content distribution, the sports fan may be able to download and view the soccer game on his or her mobile phone.

However, with the advent of electronic content distribution, many issues have arisen regarding the management and enforcement of copyrights and other forms of content protection. While many methods have been engineered to prevent the unauthorized copying, distribution and/or redistribution of electronic content, such methods often do not account for permissible or anticipated distribution and/or redistribution such as sharing among family members. While other content protection schemes have attempted to use location and distance based constraints to provide accessibility of content within a home network, the fear that such measures may be circumvented has prevented widespread adoption of such content management systems. For example, devices may be hacked and a location of the device may be artificially engineered to circumvent content sharing and (re)distribution measures that enforce rights controls based on the geographic location of the device.

Further, the use of location and distance based constraints prevents some devices from viewing or otherwise accessing the constrained content. For example, some protection mechanisms attempt to identify the location of a content requesting device in order to determine whether the device is in an authorized location to access the content. However, content play back devices exist that may not have location determination components and/or systems. As such, those devices are often restricted from accessing location constrained content even if the devices are located within an authorized region or area.

For the foregoing reasons, a system and method for enforcing geographic constraints on content distribution is needed.

SUMMARY OF THE INVENTION

Many of the aforementioned problems are solved by providing a method and system for enforcing geographic and location based content distribution constraints. By requiring content requesting devices to verify their physical location, the methods and systems described herein allow content distribution or redistribution to within a limited location or area or, alternatively, allow content distribution or redistribution everywhere except a certain excluded location or area. The physical location of a requesting device may be determined using a variety of location determination mechanisms including GPS, cellular or radio frequency triangulation and the like. Using a location determination mechanism further enhances the integrity of location information of a requesting device. Content protection and copy management schemes such as the Content Protection and Copy Management (CPCM) system used in conjunction with Digital Video Broadcasting (DVB) may also be used in conjunction with the location determination mechanisms to ensure that content is not accessed by devices in unauthorized locations. In addition, location information may be distributed to other nearby devices that may or may not have location determination means. By allowing such distribution of location information to other devices in proximity, many devices that lack location determination systems are able to access location-restricted content. In order to insure that the location information is validly used only by devices in proximity receiving the location information, distribution of the location information over long distances may be prevented.

In one aspect, distribution of the location information may be limited by DTCP-IP link protection mechanisms. For example, the location information determined by a first device may be restricted to distribution to one or more other devices within a predefined proximity. The predefined proximity may be defined as a Round Trip Time (RTT) or a number of hops. Thus, in one example, a location server or device may measure the RTT or number of hops required to transmit and receive a response to an echo request to and from a second device. Based on the measured RTT or hops and a predefined RTT threshold or Time-To-Live (TTL) parameter, transmission and access of the location information to the second device may or may not be granted. Methods and systems for measuring RTT and enforcing proximity requirements based on RTT and TTL thresholds are described in a pending application identified as Ser. No. 11/437,623, entitled "PROXIMITY ENFORCEMENT IN HETEROGENEOUS NETWORK ENVIRONMENTS," filed on May 22, 2006, which is incorporated herein by reference in its entirety. The location server or device may further digitally sign the location information file to preserve the integrity of the information.

In another aspect, a content server, content requesting devices and a location server may be a part of a CPCM system. That is, each of the servers and devices may be CPCM compliant. Thus, either the requested content or the location information or both may be protected using CPCM protocols. For example, location information may be embedded with restrictions identifying one or more authorized domains. Thus, a requesting device may only consume or use the location information if the device is within at least one of the one or more authorized domains. Alternatively or additionally, the location information or the requested content may be embedded with a Local Environment (LE) restriction. The LE restriction prevents the content or information from being distributed outside of a predefined proximity of the distributing device.

In yet another aspects, content usage restrictions and information may be embedded in the content, downloaded from a web site or web server and/or transmitted as a separate file such as a content license or rights object. A content license or right object may be bound to the location information or content file and transmitted concurrently with the file. The content license and/or rights object may further be digitally signed by an authorized entity to insure integrity of the license and usage information. Additionally, methods and systems of implementing URI based usage restrictions are described in U.S. patent application Ser. No. 11/193,494 to Jukka Alve, entitled "METHOD FOR SIGNALING GEOGRAPHIC CONSTRAINTS," filed Aug. 1, 2005, which is hereby incorporated by reference in its entirety.

In yet another aspect, the location information generated by a location server may be time stamped and include a period of validity. The time stamp may indicate the time at which the location information was determined and generated. The period of validity indicates a period of time for which the location information is valid and may be used to access geographically constrained content. This reduces the frequency with which a content requesting device must update its location information and reduces the load on the location server. Alternatively or additionally, location information may be valid for as long as the requesting device remains stationary. Methods and systems of determining whether a device has been stationary since receiving the location information include tilt switches, accelerometers and the like.

In yet another aspect, a single location server may be implemented for an entire home network or region. By only requiring that a single device has location determination systems, the cost associated with other devices in the home network may be reduced or kept at a lower level. In contrast, if all devices were required to have an integrated GPS, for example, the costs associated with purchasing and/or operating those devices (e.g., subscription fees for GPS service) may increase significantly.

These as well as other advantages and aspects of the invention are apparent and understood from the following detailed description, the attached claims, and the accompanying drawings.

BRIEF DESCRIPTION OF THE DRAWINGS

The present invention is illustrated by way of example and not limited in the accompanying figures in which like reference numerals indicate similar elements and in which:

FIG. 10 is a chart illustrating geographic codes and corresponding location information formats according to one or more aspects described herein.

DETAILED DESCRIPTION OF THE INVENTION

In the following description of the various embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Figure 1:
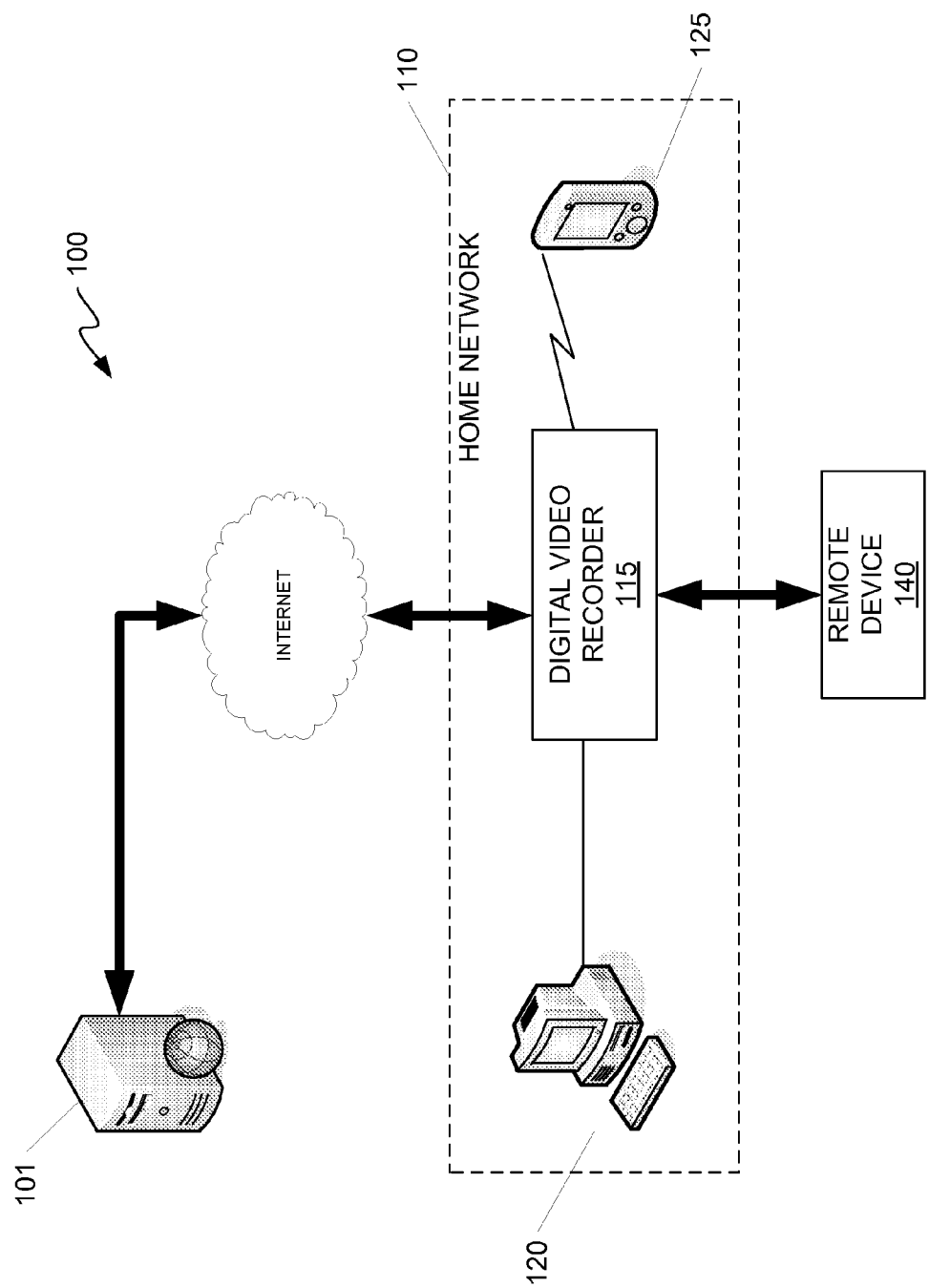
FIG. 1 illustrates a block diagram of a content distribution network in which one or more embodiments may be implemented.

Aspects of the present invention may be utilized across a broad array of networks and communication protocols. In particular, content that is subject to distribution or redistribution limitations may originate from a variety of sources and be distributed through various types of networks. FIG. 1 illustrates an example of a content distribution network 100 including a content provider 101, a plurality of authorized receiving devices such as a digital video recorder (DVR) 115, a personal computer (PC) 120 and a mobile content playback device 125. Content may be provided to each of devices 115, 120 and 125 from content provider 100 through a network such as the Internet. Other types of networks that may be used to distribute content include cellular networks, fiber optic networks as well as powerline networks. For example, wired connections between devices may be established through the use of powerlines with various products including the ZYXEL POWERLINE PL 100. Additional information about powerline networking and interoperability may be found at the HomePlug Powerline Alliance, currently hosted at www.homeplug.org/en. Content from content provider 101 may be distributed to devices such as DVR 115 through one or more intermediaries. For example, content provider 101 may provide television programming. Thus, distribution of content from provider 101 to DVR 115 may be regulated by a television service provider based on factors such as a subscription level.

Each of DVR 115, PC 120 and mobile content playback device 125 may be connected to a home network 110. The home network 110 may be implemented using numerous networking technologies and protocols including local area networks (LANs) and wide area networks (WANs). The home network 110 may further utilize both wired and wireless segments and protocols including radio frequency (RF) links and infrared connections. In one example, mobile device 125 may be linked to DVR 115 through an 802.11 wireless connection. In one or more aspects, devices 115 and 125 might not be directly connected to content provider 101 and thus, may only receive content from content provider 101 by redistribution from DVR 115.

Redistribution from DVR 115 may be controlled by redistribution protection mechanisms such as Digital Transmission Content Protection over Internet Protocol's (DTCP-IP)

proximity limitation standards. In particular, DTCP-IP verifies that devices receiving redistributed content, e.g., devices 125 and 120, are within a predefined proximity of DVR 115. A DTCP-IP compliant device may initially measure a Round-Trip Time (RTT) and/or a number of hops required to transmit data such as an echo request to a destination (i.e., requesting) device. Based on a comparison of these measurements and a predefined proximity threshold, the destination device may be authorized to receive redistributed content. Thus, in one or more arrangements, home network 110 may be defined based on, at least in part, a predefined redistribution proximity limit. One example of proximity enforcement includes evaluating a determined number of hops required for transmission of an echo request to a receiving device with respect to a Time-To-Live (TTL) threshold parameter. If the number of hops is less than or equal to the TTL parameter, the transmission of the content to the destination device may be authorized.

In contrast, unauthorized devices like device 140 might not meet the proximity requirement for redistribution from DVR 115 and thus, requests for content from device 140 may be denied by DVR 115. DTCP-IP may further specify one or more other distribution limitations including copy control information (CCI) that defines whether content may be copied and, if so, how many times. A DTCP-IP compliant device receiving content with a CCI of "Copy Never" prevents certain forms of copying of the content. The CCI may also be set to "Copy No More," which is less restrictive than "Copy Never" in that a wider variety of devices may be allowed to play the content. For example, "Copy No More" content may be restricted from being played on devices that do not support full authentication and key exchange (AKE), whereas "Copy Never" may allow content to be played on devices that support both full and restricted AKE. Other content copyright and distribution protection mechanisms may also be used in conjunction with the proximity enforcement mechanisms. For example, the Content Protection and Copy Management (CPCM) protocols used in digital video broadcasting (DVB) systems may be implemented to further insure authorized content use once a destination device has received the content. That is, the content itself may be embedded with CPCM protection mechanisms. DVB-CPCM will be discussed in further detail below.

While the content distribution network 100 of FIG. 1 provides proximity enforcement for the redistribution content, network 100 does not address enforcement of geographic location-based restrictions on content distribution. For example, Digital Video Discs (DVDs) utilize regional coding to regulate movie release dates in different regions of the world. DVD players are embedded with regional information to enforce the regional coding of the DVDs. However, even with manufacturers embedding regional codes in DVD players to support to the geographic restrictions on DVD playback, there is no control over the distribution of the physical DVD player. As such, a consumer in China, for example, may buy an American DVD player to watch DVDs with North American regional coding before the corresponding Asian regional coding DVDs are released or otherwise available. According to one or more arrangements, verification of the physical location of the playback devices may significantly improve the enforcement of such geographic restrictions.

Figure 2:
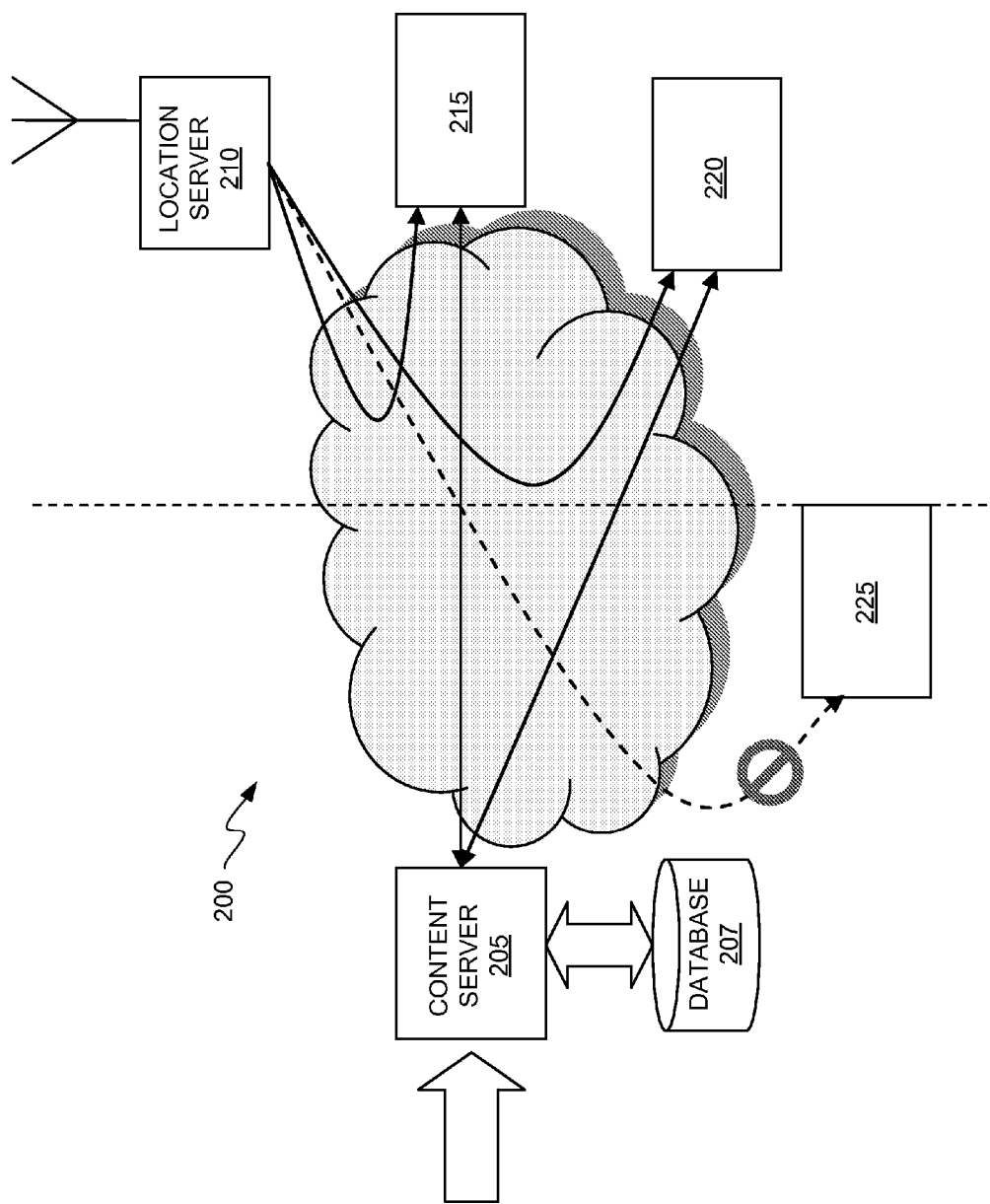
FIG. 2 is a block diagram illustrating a content distribution network having a location server for enforcing geographic constraints on content according to one or more aspects described herein.

FIG. 2 is a block diagram of a content distribution network 200 using a location server 210 to enforce one or more geography-based content protection mechanisms. Content server 205 may receive content from a variety of sources including a database 207 of stored content and/or a live streaming television transmission. The content may be transmitted over a network like the Internet to one or more rendering devices 215, 220 and 225. Devices 215, 220 and 225 may be any of a variety of devices such as a PC 120, DVR 115 and/or a mobile playback device 125 (FIG. 1). Further, while devices 215 and 220 are local to location server 210, device 225 may be located in a remote area. In one or more aspects, devices 215 and 220 may be required to adhere to Digital Living Network Alliance (DLNA) guidelines for interoperability in order to receive content from content server 205. Generally, the interoperability guidelines sponsored by the DLNA provide standards for compatibility between diverse products and infrastructures.

According to one or more aspects of the DLNA guidelines, devices such as the digital video recorder 115, PC 120, mobile playback device 125 and/or devices 215 and 220 may be categorized into three groups: Home Network Devices (HND), Mobile Handheld Devices (MHD) and Home Infrastructure Devices (HID). Home Network Devices refer to devices that share system usages in a home network with the same media format and network connectivity requirements. Typically, HNDs are stationary devices that are mains-powered, e.g., DVR 115. MHDs, while sharing the same system usages as HNDs, have different requirements for media format and network connectivity (due in part to the mobility limitations of devices). That is, mobile devices like mobile device 125 often do not have the processing power of stationary or set-top devices and thus, utilize different media formats to conserve processing power and battery life. Home Infrastructure Devices (HID) are devices having bridging functionalities for facilitating data transmission between MHDs and HNDs. For example, the HID category includes two device classes: Mobile Network Connectivity Function (MNCF) devices and Media Interoperability Unit (MIU) devices. MNCF devices provide a bridging function between the MHD network connectivity and the HND network connectivity. The MIU provides content transformation between required media formats for HNDs and MHDs.

Further, each of the device categories may further be divided into various device classes. The different classes specify different capabilities and responsibilities. For example, a HND may be classified as a Digital Media Player (DMP) device. A DMP device finds content exposed by a Digital Media Server (DMS) device to provide playback and rendering capabilities. DMS class devices, on the other hand, provide media acquisition, recording, storage and sourcing capabilities as well as content protection enforcement as required. Additional information and guidelines regarding device categorizations and classifications may be found by consulting literature provided by the DLNA, which is currently hosted at www.dlna.org.

Referring back to FIG. 2, each of rendering devices 215 and 220 may request content from content server 205. However, the content distributed by server 205 may, in one or more instances, be geographically constrained. That is, content distributed by server 205 may only be viewed or consumed by devices in a particular region of the world. In order to play back or receive this content, each rendering device 215 and 220 may be required to verify its physical location. Since devices 215 and 220 might not include location determination capabilities, devices 215 and 220 may request location validation from location server 210. Even if devices 215 and 220 have location determination systems, the devices 215 and 220 may still be required to verify their locations through location server 210 to insure the integrity of the location information.

Location server 210 may include location determination components such as a GPS to determine the server 210's current physical location. Location server 210 may be any number of devices capable of location determination such as cellular phones, GPS-equipped devices and the like. Server 210 may further utilize the proximity enforcement mechanisms of DTCP-IP to determine whether devices 215 and 220 are qualified to receive the location data. In other words, location server 210 may confirm that devices 215 and 220 are local and not remote devices like remote device 225. Proximity restrictions on the location information prevent devices that are not in the same physical location or region as location server 210 from receiving the location data from location server 210. For example, if remote device 225 attempts to retrieve location data from server 210, server 210 may reject the request based on the device's failure to meet a predefined proximity threshold. Location information or other data originating from location server 210 may also be digitally signed to verify the authenticity of the data and the integrity of the source. Digital signatures may be validated through any of a multitude of mechanisms including private/public key pairs. In one or more examples, the key required to sign a content or location information file may only be made available to legitimate manufacturers. This guards against illegitimate and unauthorized uses of the digital signature keys.

According to one or more aspects, the verified location information may be transmitted to and validated by content server 205 before the requested content is transmitted to the requesting device 215 or 220. This insures that the content is only provided to those devices 215 and 220 in the specified geographic location or area. Alternatively or additionally, content may be transmitted upon request to device 215 or 220 prior to verification of location if the content itself is protected by a content protection scheme that supports remote access and enforcement of geographical constraints. Such content protection schemes may include CPCM systems that enforce content protections through CPCM compliant devices.

Figure 3:
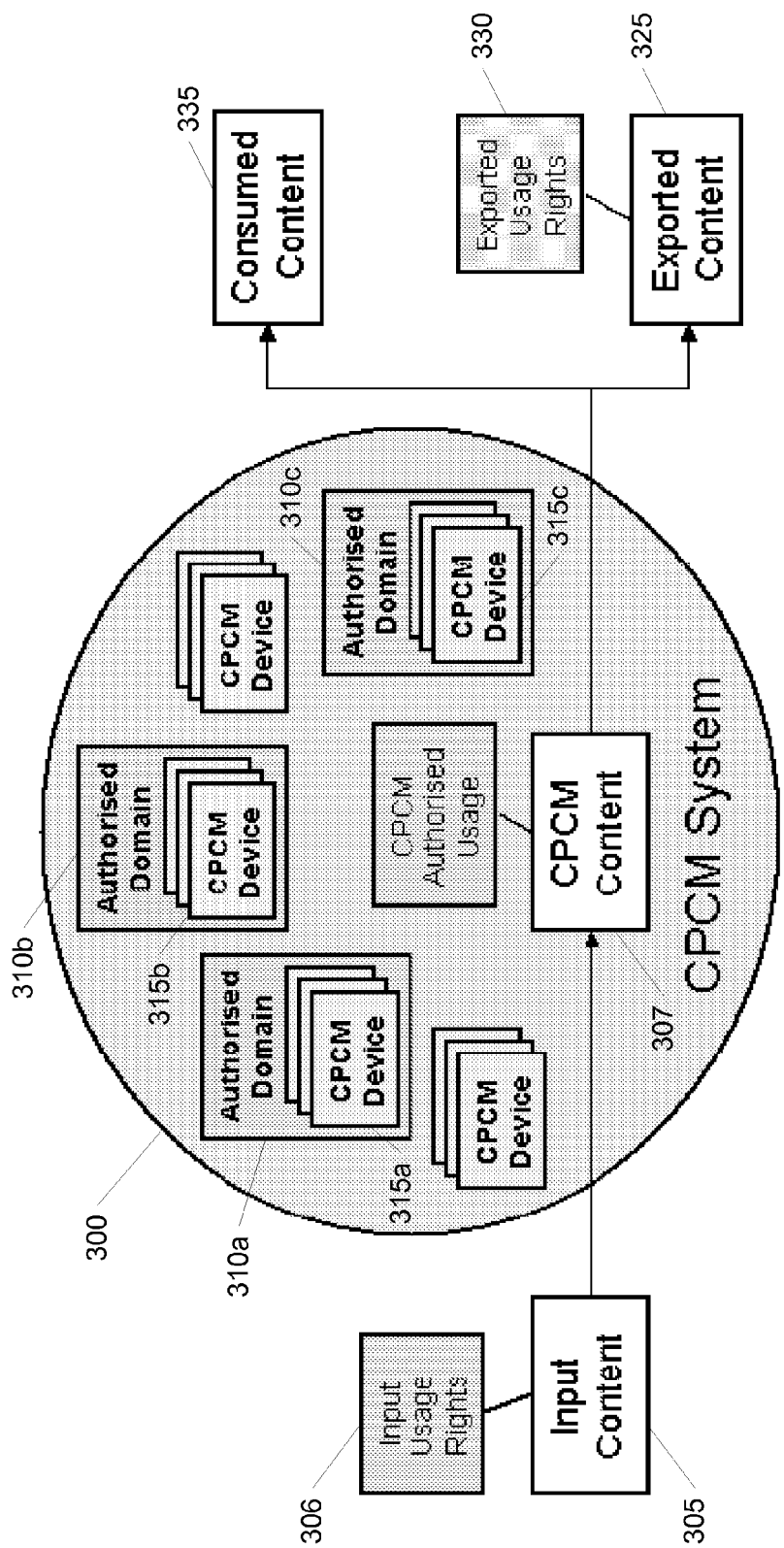
FIG. 3 is a block diagram illustrating a Content Protection and Copy Management System according to one or more aspects described herein.

FIG. 3 is a block diagram illustrating an example CPCM system 300. A CPCM system may be defined as the set of all CPCM compliant devices. CPCM compliant devices generally implement one or more of five abstract content management functions including Acquisition, Storage, Processing, Consumption and Export. Acquisition refers to the conversion of input content 305 and/or associated usage rights 306 into CPCM content 307. Consumption and Export, in contrast, relate to CPCM content leaving the CPCM system. For example, content 335 may be consumed once the content 335 has been rendered (e.g., rendered light and sound of a video). CPCM content may be considered exported once the content is no longer explicitly protected and managed by the CPCM system. Once exported, usage rights 330 associated with content 325 that was previously protected by CPCM may be exported and/or extracted from the content.

CPCM system 300 includes multiple CPCM compliant devices as well as numerous authorized domains 310*a*, 310*b* and 310*c*, each including one or more CPCM devices 315*a*, 315*b* and 315*c*. CPCM enforces the distribution of content through a variety of usage rules and rights 306 defined in a Usage State Information (USI) field in CPCM Content metadata. In one or more aspects, CPCM content distribution may be limited to an authorized domain 310*a*, 310*b* or 310*c*. Authorized domains 310*a*, 310*b* and 310*c* are defined by logical groupings of devices 315*a*, 315*b* and/or 315*c*. In one or more arrangements an Authorized Domain Manager (ADM) may securely join devices 315*a*, 315*b* and/or 315*c* to the authorized domain according to one or more predetermined rules and conditions. The ADM may be a dedicated device or may be a functionality or component built into CPCM compliant devices.

For example, devices 315*a* associated with a certain household may be grouped into one authorized domain 310*a*. In another example, devices 315*b* associated with a certain business or organization may be grouped into another authorized domain 315*b*. Additionally, the USI may further be set to the "Local Environment" (LE). The LE property is a dynamic ad-hoc property that is determined by a CPCM device's location. To enforce an LE restriction, a CPCM device may determine whether another device is local based on a proximity test. CPCM provides a variety of other usage restrictions including time-based usage limitations and concurrent usage restrictions. Additional information regarding CPCM and usage restrictions may be found by consulting the Digital Video Broadcasting Project, currently hosted at www.dvb.org and/or Digital Video Broadcasting (DVB) document A094 Content Protection & Copy Management, currently hosted at www.dvb.org/technology/dvb-cpcm/a094.DVB-CPCM.pdf.

Figure 4:
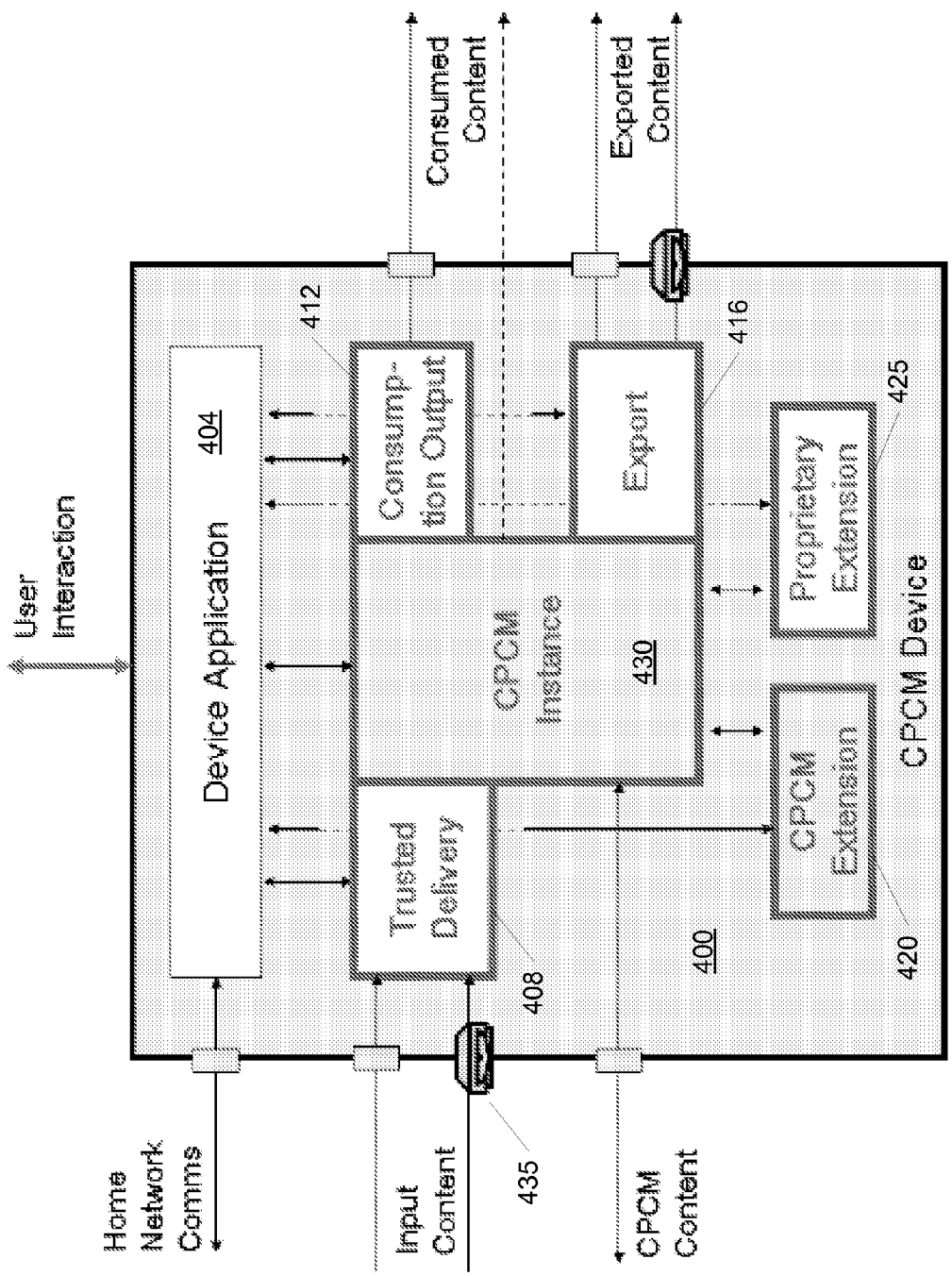
FIG. 4 is a block diagram of a Content Protection and Copy Management compliant device according to one or more aspects described herein.

FIG. 4 is a block diagram of a CPCM compliant device 400. Device 400 includes a device application 404, trusted delivery module 408, consumption output module 412, export module 416, CPCM extension module 420 and proprietary extension module 425. Device 400 further includes a CPCM instance component 430 which manages CPCM compliance and stores CPCM functionalities. Device application 404 may be an underlying operating system and/or other application running on device 400. In one or more instances, device application 404 may coordinate and manage communications and other interactions between one or more other devices. The inter-device communication and/or interaction may be performed using home networking protocols and communication facilities. Examples of inter-device interactions include content discovery, content selection and content usage control and status. Device 400 may acquire content from various sources including attached input devices such as a DVD-ROM drive 435 or a USB drive. Sources of non-CPCM input content are initially verified by trust delivery module 408 to authenticate the source. Device 400 and CPCM instance component 430 may authorize receipt of content from trusted sources. Once content is CPCM compliant, CPCM protected content may then be transmitted and received freely with other CPCM devices or instances. CPCM and proprietary extension modules 420 and 425, respectively, provide flexibility in the CPCM device for enhancing the operability of either CPCM functionalities or propriety functionalities.

CPCM compliant devices such as device 400 further provide two modes of output, consumption and export. Consumption output module 412 allows content to be consumed (e.g., rendered) by device 400, itself, or via some other consumption compliant output. Consumption or consumption output may be determined to be compliant based on predefined compliance and robustness rules. Alternatively or additionally, various forms of consumption or consumption outputs may be required to pass an approval process. Export component 416, on the other hand, manages the discharge of content from the CPCM device 404 and system as a whole. Once content has been exported, the content is no longer protected by CPCM protocols. That is, usage rights embedded in the content might not be enforced. Further details on CPCM devices and system may be found by consulting Digital Video Broadcasting (DVB) document A094 Content Protection & Copy Management, currently hosted at http://www.dvb.org/technology/dvb-cpcm/a094.DVB-CPCM.pdf Referring again to FIG. 2, content protected by CPCM mechanisms may specify an authorized use and/or playback region or area in metadata embedded in the content. In such cases, devices 215 and 220 may be required to be CPCM compliant to insure proper enforcement of the CPCM protection mechanisms upon receipt of the content in devices 215 and 220. In one example, device 215 is a CPCM compliant device and thus enforces the geographic constraints specified by the CPCM content. One method of enforcing the geographic constraint includes comparing location information obtained from location server 210 with the authorized regions and/or areas identified in the CPCM content. While the discussion with respect to CPCM and geographic constraints has focused, in large part, on locations that are authorized to access or receive content, content may also be constrained based on locations or regions that are unauthorized to receive or access the content. For example, CPCM content protection mechanisms may specify one or more domains or locations that are to be excluded (rather than included) from authorization for a particular content item.

In one or more arrangements, location server 210 may store and use one or more templates for encapsulation of the location information. Depending on the system (DVB CPCM, DLNA, or other delivery system) implemented through the network, the location server 210 may select a corresponding template and process and transmit the location information using the selected template. Alternatively, location server 210 may transmit the location information using more than one template thus being able to provide location information to multiple devices 215 and 220 that may be using different protection systems and protocols. The location information requesting device 215 or 220 may further send one or more templates in the request to location server 210 that may be used by location server 210 in responding to the request for location information. Location server 210 or the device acting as the location server may further be able to map the location information it has acquired or possesses into a form that is understandable and processable by the requesting device 215 or 220 and/or by the protection system. For example, a location server like server 210 may map cell identification of a cellular telephone, e.g. device 215, in a cellular network system into a geographical area. In addition, location server 210 may also request the mapping from another server (not shown) such as an Internet site, for example, prior to transmitting the location information to the one or more requesting devices 215 and/or 220.

Location information from location server 210 may further be encapsulated in a similar way that the content or usage rules, e.g., USI, for the content are encapsulated. As part of the encapsulation, the location information message may include in addition to the location data expressed in one or more formats one or more of the following: identification of the message, type of the message, protection system used, identification of the requesting device, identification of the location server, validity time for the location information, format used for location data.

In one or more aspects, location information transmitted from server 210 may be protected and encapsulated using DVB-CPCM protocols and systems. Specifically, the location information determined by server 210 may be protected from distribution outside of a certain authorized domain or local environment by using CPCM protocols. In one example, the location information distributed by location server 210 may be restricted to one or more identified authorized domains. Upon receiving the location information from server 210, devices 215 and/or 220 may verify that they are within the specified authorized domain. In addition, devices 215 and 220 may transmit the location information only to devices within the specified authorized domain. Thus, devices 215 and 220 would prevent transfer of the location information to devices such as device 225 that are not within a specified authorized domain. Additionally, location server 210 may further tag the location information with an LE flag to restrict usage of the location information to a local environment of either device 215 or 220 or both. The use of the LE flag prevents transmission of the location information to devices outside of a predetermined range or proximity.

According to one or more aspects, a location server may be implemented in a home network in which Universal Plug-n-Play (UPnP) is used for content discovery. With a UPnP implementation, the location server may store location information in a file that is published and treated as a content file. The content file may be protected by a variety of content protection mechanisms including CPCM. As such, the content file may include CCI that specifies that level of authorized copying (e.g., Copy Never or Copy No More). In addition, the content file may be flagged with a location information element that identifies the content file as a location information file. This may allow devices to more easily identify such information. The content file may further be published in the UPnP Content Discovery Service (CDS) with or without the aforementioned tags and identifiers. Distribution of the location information content file may further be protected using DTCP-IP methods in addition to or as an alternative to CPCM measures.

Figure 5:
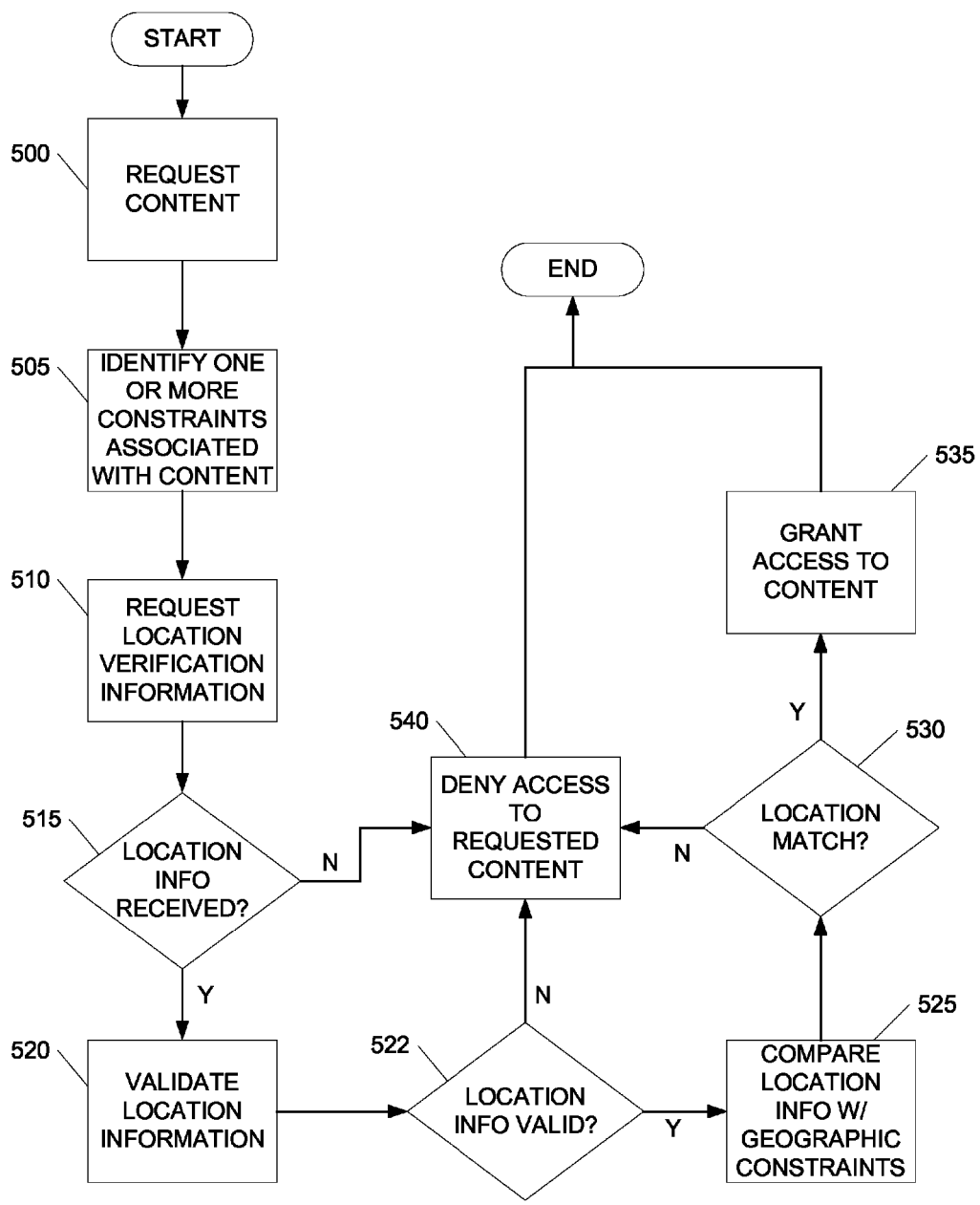
FIG. 5 is a flowchart illustrating a method for requesting geographically constrained content and validating location information according to one or more aspects described herein.

FIG. 5 is a flowchart illustrating a method for requesting content and enforcing content protection mechanisms associated with the requested content by a receiving or rendering device. In step 500, the rendering or receiving device may request content from a content server or service provider. A service provider may be an intermediary between the requesting device and a content server that provides access to content based on various factors such as a subscription fee. Upon requesting the content, the requesting device may identify one or more geographic constraints associated with the requested content in step 505. The identification of the constraints may result from a notification from the content server prior to transmission of the content, or alternatively, the requesting device extracting content restrictions from the content upon receipt. The process of identifying constraints may depend on the content protection system implemented. For example, if the content is protected by CPCM, the content server may transmit the content to the requesting device and allow the requesting device to identify and enforce the protections specified in the content.

In step 510, the requesting device may request location verification information from a location server. In some instances, even if the requesting device is capable of determining its own physical location, the requesting device may still be required to request location information from a location server to insure the integrity of the information. After making the request, the requesting device may then determine whether the location information has been received from the location server in step 515. The determination may be made based on a predefined wait time or in response to a message received from the location server. If the location information has not been received in step 515, access to the content may be denied in step 540. Location information may be denied for a variety of reasons including failure of the requesting device to meet proximity limitations.

If, however, the location information is received in step 515, the requesting device may validate the location data in step 520. Validation may include one or more processes including verifying the source of the data and enforcing content protection schemes associated with the location information. For example, in order to insure the integrity of the location information, the location information may be digitally signed by the location server. Thus, the requesting device may verify the digital signature using various mechanisms including private/public key pairs and the like. Alternatively or additionally, the location information may be protected by content protection schemes like CPCM. For example, the location information may include embedded restrictions specifying one or more authorized domains for use or consumption of the information. Thus, a CPCM compliant requesting device may extract the constraints on the location information and enforce the protections. Thus, in step 522, the requesting device may determine whether the location information is valid. If the information is not valid, the requesting device may be denied access to the requested content.

On the other hand, if the requesting device determines that the location data is valid, the location data may be compared to the geographic constraints associated with the requested content in step 525. The geographic constraints may include a predefined region or zone such as the DVD regional coding numbers. Requesting devices may store a look-up table or other database associating various location information including zip codes, area codes and/or latitude/longitudes with the predefined regional or zone codes. The information stored in the database may depend on the type of location data returned by the location server. The requesting device may then determine whether the location data matches the geographic constraints in step 530. If the location data does not match the geographic constraints associated with the requested content, then the requesting device may be disallowed from accessing the requesting content in step 540. If, however, the location data does match the geographic constraints, access may be granted to the requested content in step 535. In the case where the content is received by the requesting device prior to location verification, the content may be unlocked or otherwise accessed by the requesting device upon location validation. If, however, the content is held by the content server until the location of requesting device is validated, step 535 may include receiving the requested content from the content server.

Further, depending on whether the location information is protected or signed, steps 520 and 522 may be optional and bypassed. For example, if the location information is not digitally signed by the location server and no content protection mechanism is integrated into the location data, the requesting device might not need to validate the location data. In one example, the location server may be known to be a trusted device and the communication channel between the location server and the receiving device may be secured by one or more other means. In such a case, validation of the location data might not be necessary and/or performed. Instead, the requesting device may proceed directly from receipt of the location information in step 515 to comparing the location data to the geographic constraints of the requested content in step 525.

Figure 6:
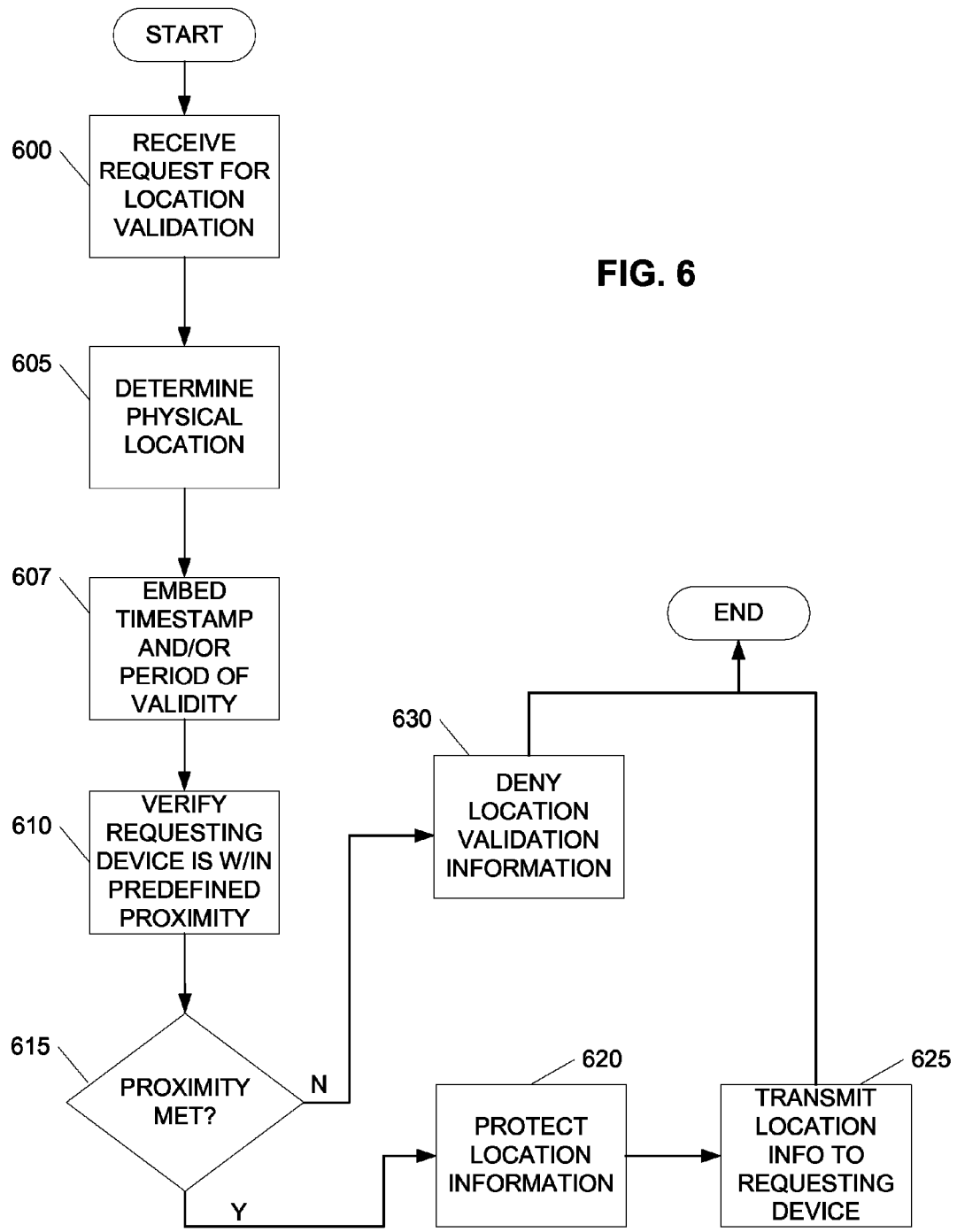
FIG. 6 is a flowchart illustrating a method for obtaining and publishing location information to one or more requesting devices according to one or more aspects described herein.

FIG. 6 is a flowchart illustrating a method for validating the location of a content requesting device. In step 600, a location server or a device having a location determination mechanism may receive a request for location validation from a device requesting geographically constrained content. For example, the location server or device may be a mobile telephone, whose location may be determined using triangulation. Alternatively, the location server may be a device having a GPS component. Using the location determination mechanism, the location server, in step 605, determines the server's own physical location. The location may be expressed in terms of a latitude/longitude, a zip code, an area code and/or a combination thereof. In one or more arrangements, the location server may be implemented in a UPnP network and follow DLNA guidelines. Thus, the location server may publish the location information as a content file with a location information tag in the UPnP CDS. Additionally, the location information may also be tagged with a DTCP-IP element. The DTCP-IP tag prevents transmission of the location information file before enforcement of proximity limitations.

In step 607, the location server may further embed a time stamp and/or a period of validity in the location information. The time stamp indicates the time the location information was determined and the period of validity provides a window of time during which the location information may be considered valid. Alternatively or additionally, the time stamp and/or period of validity information may be included in a license or rights object that is bound to the location information file. The license or rights objects may then be transmitted to the receiving/requesting device along with the location information file.

In step 610, location server may verify that the requesting device is within a predefined proximity of the server. Verifying that the requesting device meets proximity requirements may be performed by determining Round Trip Times and/or a number of hops associated with transmitting data to the requesting device and receiving a response. For example, the predefined proximity threshold may include a threshold RTT. Thus, the location server may transmit an echo request to the requesting device while measuring the RTT associated with the echo request. The RTT of the echo request may then be compared to the threshold RTT to determine whether the proximity requirement has been met. If the proximity requirement is not met in step 615, the location information might not be transmitted to the requesting device. Instead, a denial message may be transmitted to the requesting device in step 630. If, however, the requesting device meets the proximity requirement, the location server may perform optional protection processes in step 620. For example, the location server may embed CMCP protection mechanisms such as USI data in the location information in step 620 to provide an additional layer of protection for the location information. Alternatively or additionally, the location server may digitally sign the location information file. The processes discussed in step 620 are not only optional, but may also be performed at any point after the location of the location server is determined in step 605. Once the location information has been prepared, the information may then be transmitted to the requesting device in step 625.

Alternatively or additionally, a requesting device may request location validation information from a location server only if the requesting device does not currently have valid location information. The validity of stored location information may be determined using the time stamp and period of validity that may be embedded by the location server. Thus, in one example, a requesting device may request location information from a location server at 3:00 PM. The location server may determine that the location information is valid for 24 hours. Thus, any geographically constrained content requested by the requesting device between 3:00 PM and 2:59 PM the next day may be validated using the same location information. That is, during that time period, the requesting device does not have to re-request location information from the location server. This process of location validation not only reduces load on the location server, but also allows mobile devices to receive content for a predefined period while away from a home network (i.e., disconnected from the location server).

Figure 7:
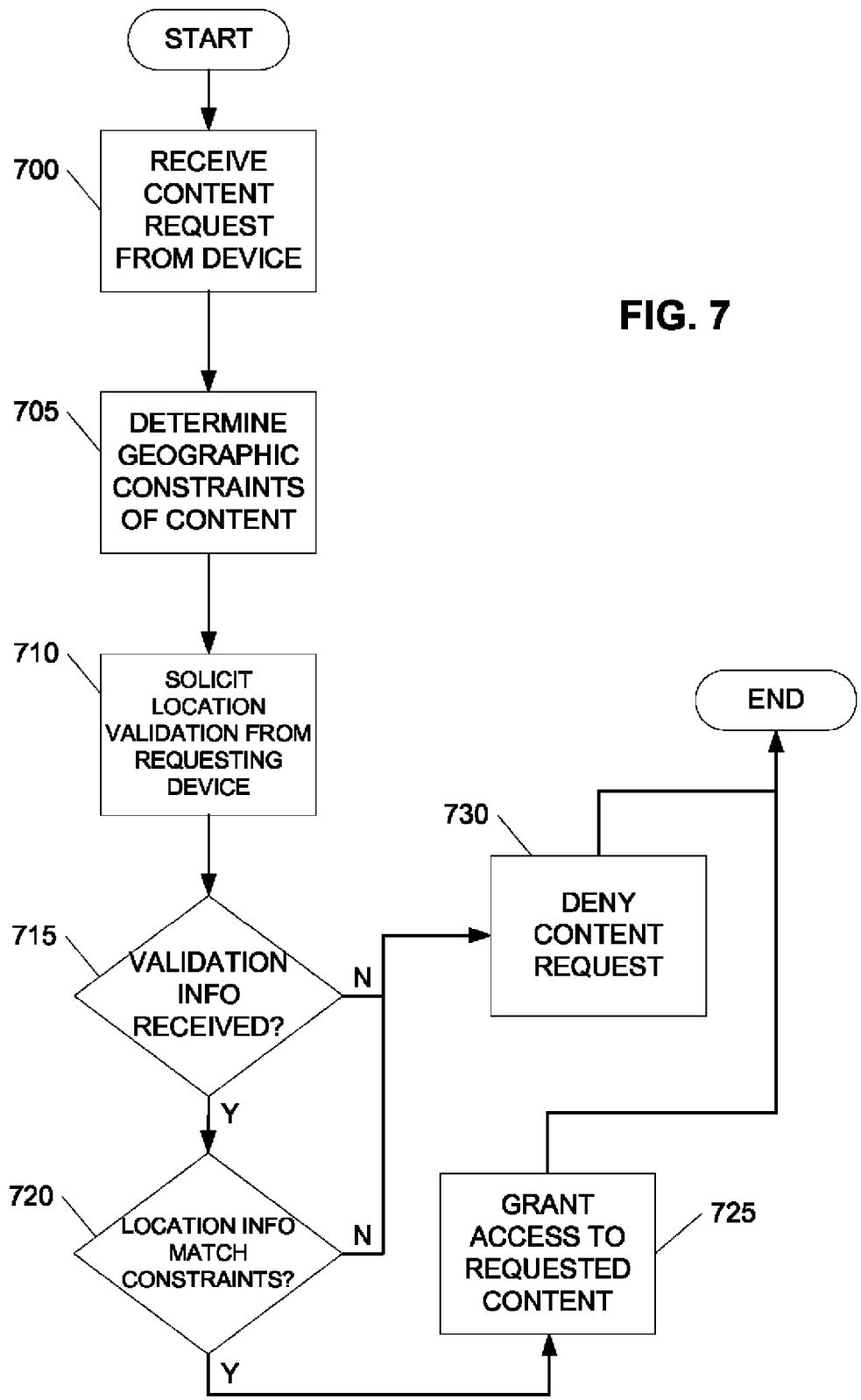
FIG. 7 is a flowchart illustrating a method for processing a request for geographically constrained content according to one or more aspects described herein.

FIG. 7 is a flowchart illustrating a method for processing a content request received from a rendering device. In step 700, a content request may be received from a requesting device. The content request may include a variety of information including an identifier associated with the content, a time of the request, a desired format and a desired language. In response to the request, geographic or location-based constraints on the requested content may be extracted or otherwise identified in step 705. For example, constraints may be extracted from embedded metadata stored in the requested content. Once the geographic constraints have been identified, the requesting device may be solicited for location validation information in step 710. Requesting location validation data from the content requesting device insures that the content is not distributed to a device in an unauthorized region or location. In step 715, a determination may be made as to whether location validation information has been received. If information other than location information is received or if no response is received within a specified period of time, the content request may be denied in step 730.

If, however, location validation information is received in step 715, a further determination may be made as to whether the location validation data matches the geographical constraints of the requested content in step 720. If the location validation data satisfies the geographic constraints of the requested content, the requested content may be appropriately transmitted to the requesting device. However, if the location validation data does not match the geographic constraints, the request for content may be denied in step 730.

According to one or more aspects, usage and consumption rules and restrictions associated with a content file or item might not be transmitted with the content file. Instead, the content file may specify one or more Uniform Resource Identifiers (URIs) from which the usage rules may be acquired or otherwise determined. Whether the device requesting and/or receiving the content is in compliance with the usage and consumption rules may be evaluated by the receiving device or the web page(s) or server(s) associated with the specified URIs.

Further, while time stamps and periods of validity have been discussed as a method of alleviating the need for a content requesting device to verify location information each time the device requests new content, other additional or alternative methods and systems may also be employed. For example, location information may be valid for use by a requesting device as long as the device has been stationary since the location information was last verified. Determining whether a device has been stationary may be performed using a variety of methods and systems including tilt switches, accelerometers and the like. In one example, a requesting device may prove it is stationary by virtue of being plugged into an electrical socket. Thus, whether the requesting device has been stationary may be determined based on whether the device's power supply has been uninterrupted since the location information was last received or validated.

Figure 8:
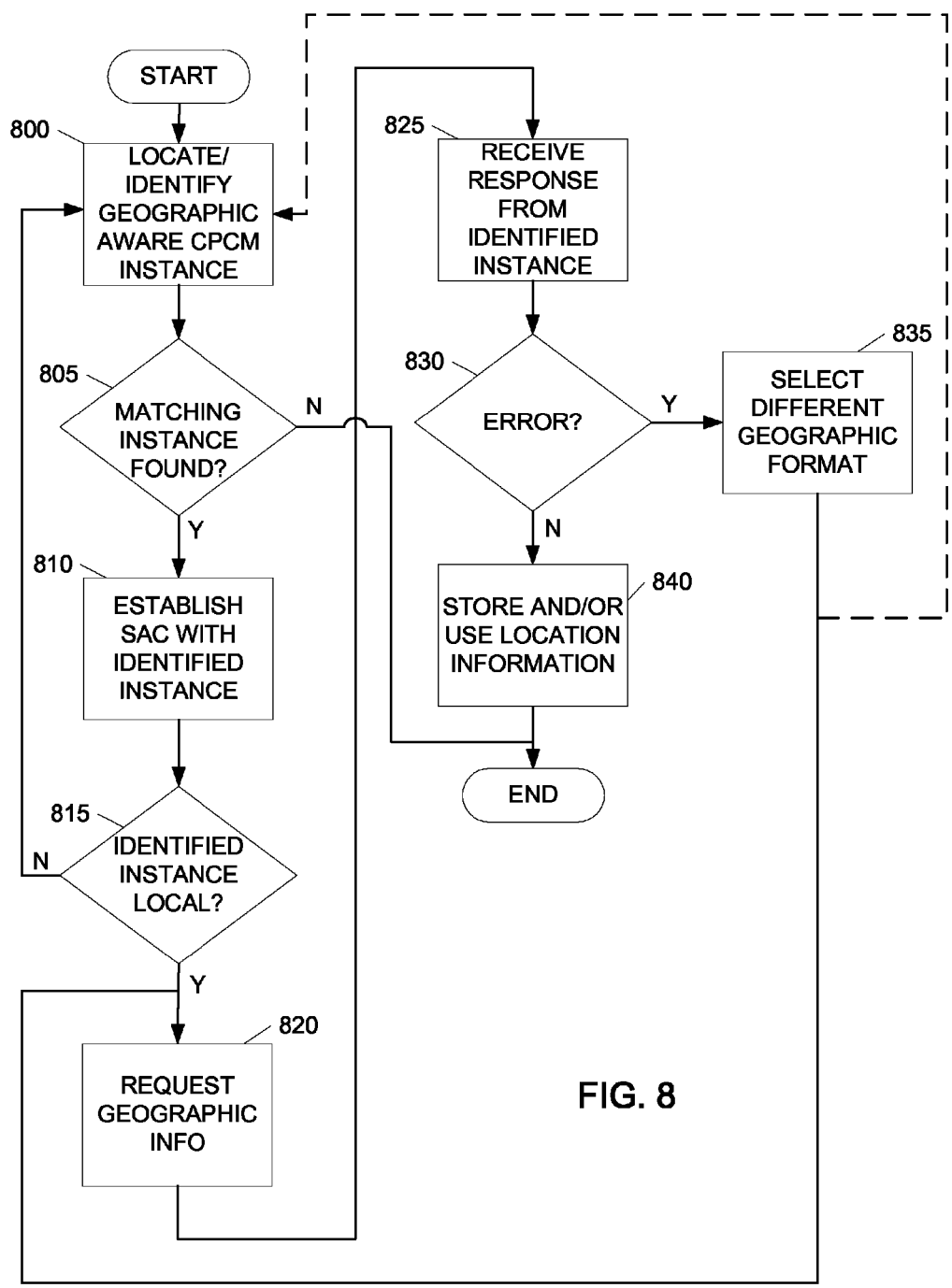
FIG. 8 is a flowchart illustrating a method for a CPCM device or instance to obtain location information from a geographic aware device or instance according to one or more aspects described herein.

FIG. 8 is a flowchart illustrating a method for retrieving location information by a first CPCM instance from a second CPCM instance. In step 800, the first CPCM instance may locate geographically aware CPCM instances within a local area. That is, the CPCM device may attempt to locate another device that is capable of detecting its own location. A local area may be predefined based on a distance, a maximum transmission time, a number of transmission hops and the like. A CPCM instance may locate a second CPCM instance capable of determining geographic location by checking a geographic aware field in a CPCM Instance Certificate.

In step 805, the CPCM instance may determine whether a geographic aware second CPCM instance is present in the local area. If so, in step 810, the CPCM instance may establish a secure authenticated channel (SAC) with the second CPCM instance. In one or more instances, a SAC might only be established with geographic aware devices or instances. Additionally or alternatively, if the second instance already has a SAC established with the CPCM instance, the SAC may be renewed (e.g., instead of creating a new SAC). In step 815, the CPCM instance may confirm that the second CPCM instance is local. If the CPCM instance confirms that the second CPCM instance is local, the CPCM instance may then request geographic location information from the second CPCM instance in step 820. In one example, the CPCM instance may issue a GetGeographicLocation (Geographic_Location_Format) command in a message to the second CPCM instance. The Geographic_Location_Format parameter may be used to select a desired format for the location information.

In step 825, the CPCM instance may receive a response from the second CPCM instance. The CPCM instance may determine whether the response includes an error message or code in step 830. An error may result if the specified geographic location information format is not supported or unknown. If the message includes an error, the CPCM instance may retry the request using another geographic format in step 835. Alternatively or additionally, the CPCM instance may restart the process and locate another geographic aware CPCM instance that supports the specified format. If no error is included in the response and the response includes the requested location information, the CPCM instance may store and/or use the location information (e.g., to access protected content) in step 840. Further, in one or more configurations, the geographical format or formats that the geographic aware device supports may be enquired by, for example, using messages of a geographic location enquiry protocol 'CPCM Enquire Geographic Location Format'. Correspondingly, the response message may, in such instances, be formatted according to 'CPCM Geographic Location Format Response'. Using such messaging may help avoid the trial-and-error method.

If, on the other hand, in step 815, the CPCM instance determines that the second CPCM instance is not local, it may begin the search for a geographic aware CPCM instance anew. That is, the CPCM instance may initiate another search for a geographic aware CPCM instance by identifying CPCM Instance Certificates with a Geographic Aware flag set or a specific value in a Geographic Aware field (e.g., a value of '1' may indicate that the CPCM instance is geographic aware, whereas a value of '0' may indicate that the instance is not geographic aware).

Figure 9:
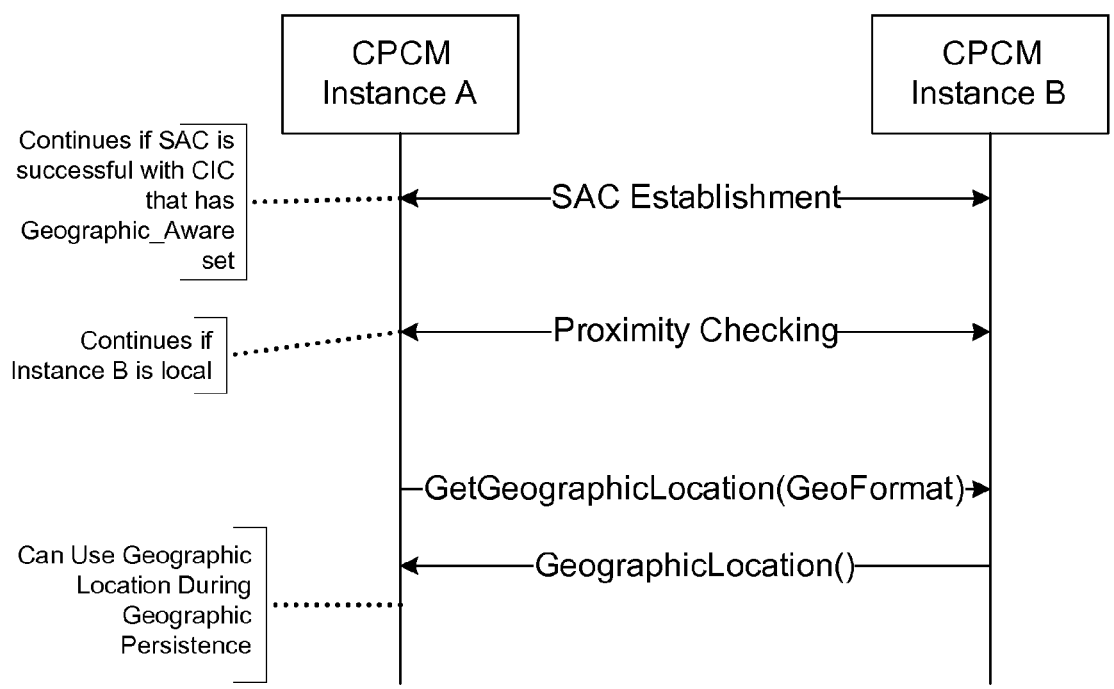
FIG. 9 illustrates an interaction flow between a first CPCM instance and a second CPCM instance for acquiring location information according to one or more aspects described herein.

The process by which a CPCM instance may obtain geographic information is illustrated in FIG. 9. As discussed, a CPCM Instance A, upon finding a geographic aware CPCM Instance B, may establish a SAC with CPCM Instance B. CPCM Instance A may then confirm proximity with CPCM Instance B. If proximity is confirmed, Instance A may then request geographic information from Instance B using, for example, a 'CPCM Get Geographic Location' query according to one or more DVB CPCM system arrangements. Instance A may further specify a geographic format in which Instance A wishes to receive the requested information. In response to the request, Instance B may send back a response message including the geographic information in the specified geographic format using, for example, a 'CPCM Get Geographic Location Response' response format in one or more DVB CPCM system arrangements. Alternatively, Instance B may issue an error message indicating that the geographic format is unknown and/or unsupported.

FIG. 10 is a chart illustrating codes associated with various types of geographic location formats, the format used and the size required for the format. In one or more configurations, for example, a geographic location format code of '0' may correspond to an ISO 3166-1-alpha-2 country code format encoded as a string of 8-bit ASCII characters. The size of the data in the '0' format may be 2 bytes. Additionally or alternatively, a format code of '1' may correspond to a 2-D coordinate format including a latitude and longitude. Each of the latitude and longitude may be defined based on an 8 bit degree field (e.g., 0-180), a 6 bit minute field, a 6 bit second field and 3 bit second fraction field or variations thereof. In addition, each of the latitude and longitude may further include a '+' or '−.' The latitude and longitude may be constructed using a bit sequence, most significant bit first (bsmsbf) format. In yet another example, a geographic location format code of '2' may correspond to a 3-D coordinate format. In addition to latitude and longitude, a 3-D coordinate format may also include elevation represented as a 16 bsmsbf (e.g., range of 0 to 65535 feet above sea level). Further, according to one or more configurations, a geographical constraint for an item of content may be defined by an area that is more complex than can be expressed with a country code. For example, a geographical area constraint may be a list of country codes and in a further embodiment a geographical constraint may be expressed as one or more country codes minus a black-out area that may be expressed, for example, with a latitude-longitude pair and a radius or as a set of latitude-longitude pairs representing corners of an area. When a location is given as a latitude-longitude pair, verification of whether the location is included or not within an area may involve geometrical calculations or access to a digital map.

Figure 11:
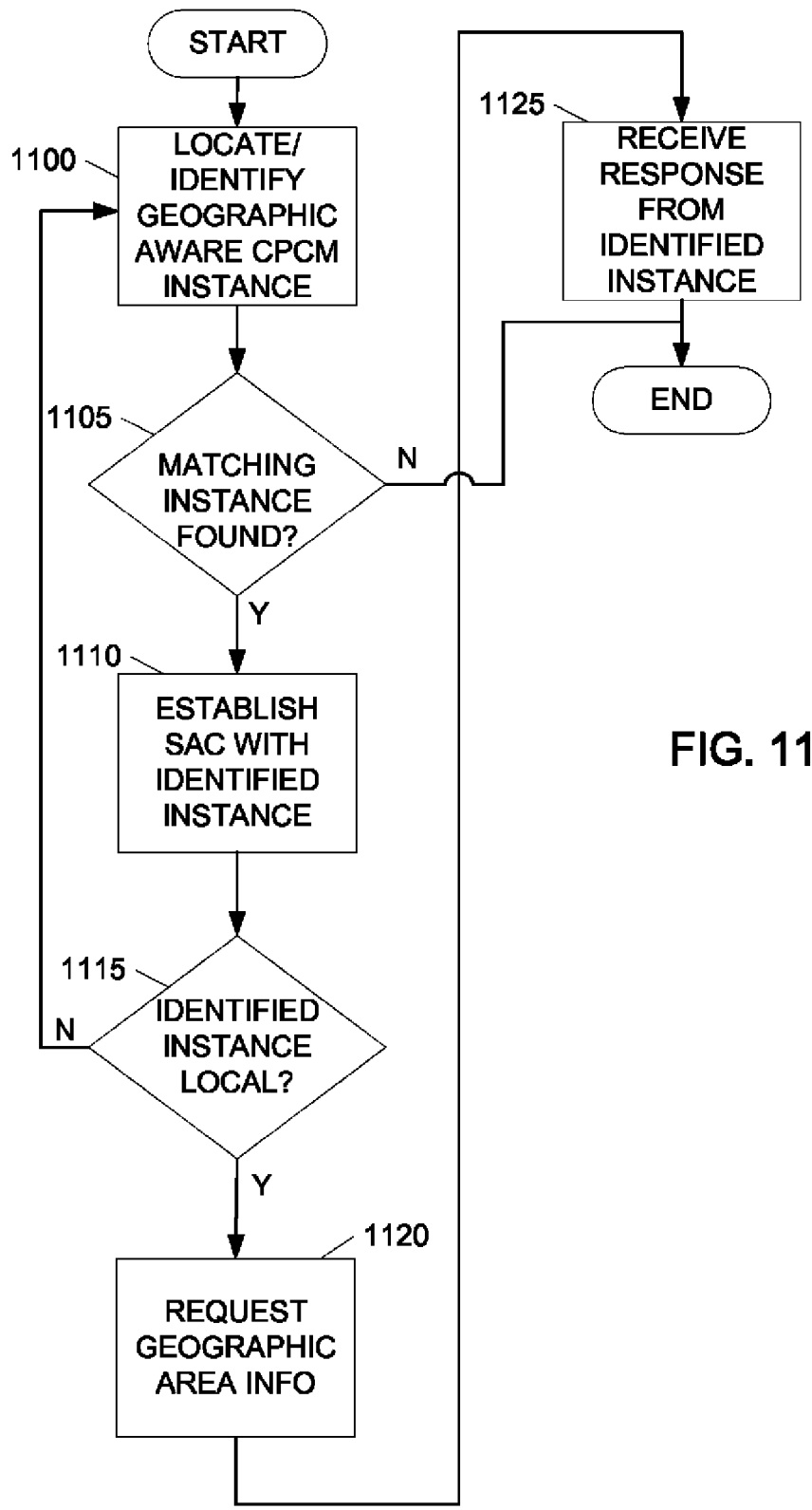
FIG. 11 is a flowchart illustrating a method for a device or instance to confirm inclusion within a geographic area using geographic information from a second device or instance according to one or more aspects described herein.

In addition to determining geographic location using another CPCM instance, a CPCM instance may also ask another CPCM Instance to determine whether the first CPCM instance is located within a particular geographic area. FIG. 11 is a flowchart illustrating a method for a first CPCM instance to request confirmation of inclusion within a particular geographic area from a second CPCM instance. Such a method may be used where a content file is restricted to a certain geographic area. In step 1100, the requesting CPCM instance may identify any geographic location aware instances in a local area. In step 1105, the requesting CPCM instance may determine whether any such CPCM instances were identified. If so, the requesting CPCM instance may establish a SAC with an identified geographic aware CPCM instance in step 1110. Alternatively or additionally, if the requesting CPCM instance already has a SAC established with the identified geographic aware CPCM instance, the requesting instance may renew the SAC (e.g., rather than establishing a new SAC).

In step 1115, the requesting CPCM instance may confirm that the identified geographic aware instance is within proximity (e.g., a local area) of the requesting instance. The CPCM instance may confirm the proximity using various proximity tests as described herein. If confirmed, the requesting instance may request geographic area information from the identified CPCM instance in step 1120. As part of the request, the requesting instance may also specify a geographic area. The specified geographic area may represent the area the requesting instance wants to confirm that it is in. In one or more arrangements, the request message may be authenticated using an SAC authentication key. The geographic area specified may be in the same format as specified in an USI of a CPCM protected content item.

In step 1125, the requesting instance may receive a response from the geographic aware instance including a determination of whether the requesting instance is within the specified geographic area. The message may include a code such as 0="yes", 1="no", 2="unable to determine," and the like. Other codes and/or response formats may also be used. The response message may also be authenticated by an SAC authentication key.

Figure 12:
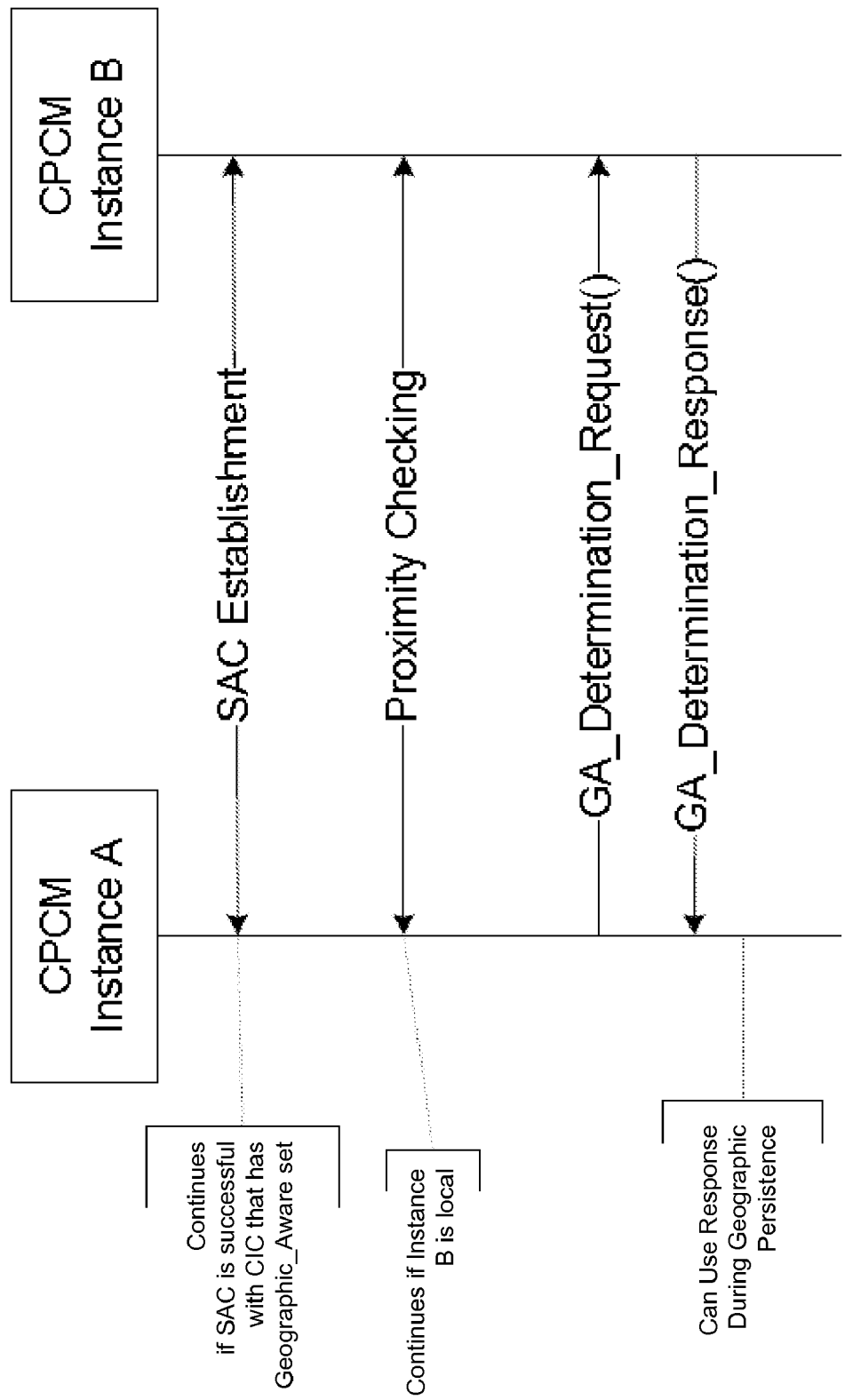
FIG. 12 illustrates an interaction flow between two devices or instances in confirming inclusion within a geographic area according to one or more aspects described herein.

FIG. 12 is a diagram illustrating the interaction flow between a CPCM Instance A and a CPCM Instance B, where CPCM Instance A requests confirmation of its location within a particular geographic area from CPCM Instance B using, for example, a request 'CPCM Affirm Geographic Location' format of the exemplary DVB CPCM system. The response message may be for example a response 'CPCM Affirm Geographic Location Response' of the DVB CPCM system.

The methods and features recited herein may further be implemented through any number of computer readable mediums that are able to store computer readable instructions. Examples of computer readable mediums that may be used include RAM, ROM, EEPROM, flash memory or other memory technology, CD-ROM, DVD or other optical disk storage, magnetic cassettes, magnetic tape, magnetic storage and the like.

The present invention has been described in terms of several exemplary embodiments thereof. Numerous other embodiments, modifications and variations within the scope and spirit of the appended claims will occur to persons of ordinary skill in the art from a review of this disclosure.

We claim:

1. A method comprising:
   receiving, at a first device, content protected by a geographic constraint;
   identifying, by the first device, a second device that is capable of determining a geographic location of the second device, wherein the second device is physically separate from the first device;
   in response to identifying the second device that is capable of determining the geographic location of the second device, determining, by the first device, that the second device is within a predefined proximity of the first device, wherein the predefined proximity defines a boundary outside of which devices are not authorized to receive the geographic location of the second device; and
   in response to determining that the second device is within the predefined proximity:
     requesting location information from the second device;
     receiving, at the first device, the requested location information from the second device, wherein the requested location information includes the geographic location of the second device as determined by the second device;
     determining, by the first device, whether the requested location information satisfies the geographic constraint associated with the protected content; and
     enabling, by the first device, access to the protected content in response to determining that the requested location information satisfies the geographic constraint.

2. The method of claim 1, wherein determining that the second device is within a predefined proximity of the first device includes determining a round trip transmission time of data between the first device and the second device; and wherein the predefined proximity of the first device is based on the round trip transmission time of data between the first device and the second device.

3. The method of claim 1, wherein requesting location information from the second device includes transmitting a template including data that specifies at least one of a format and a protocol for sending the requested location information.

4. The method of claim 1, wherein the first device is a Content Protection and Copyright Management (CPCM) compliant device.

5. The method of claim 1, wherein the predefined proximity includes a predefined physical distance.

6. The method of claim 1, wherein the request for the location information from the second device includes a specification of a geographic location format.

7. The method of claim 1, wherein the location information received from the second device includes a timestamp and a period of validity.

8. The method of claim 6, further comprising receiving an error code from the second device, the error code indicating that the geographic location format is unsupported.

9. The method of claim 1, further comprising establishing a secure authentication channel (SAC) between the first device and the second device upon determining that the second device is capable of determining the geographic location of the second device.

10. The method of claim 9, wherein at least one of the request and the response is authenticated using a SAC authentication key corresponding to the SAC.

11. The method of claim 1, further comprising:
in response to determining that the second device is not within the predefined proximity of the first device, identifying, by the first device, a third device physically separate from the first and second devices, the third device being capable of determining a geographic location of the third device.

12. The method of claim 1, wherein determining whether the location information satisfies the geographic constraint includes determining whether the geographic location of the second device satisfies the geographic constraint.

13. The method of claim 1, wherein the requested geographic information is received as a content file discoverable using a content discovery protocol.

14. An apparatus comprising:
at least one processor; and
at least one memory storing computer readable instructions that, when executed by the at least one processor, cause the apparatus to:
receive content protected by a geographic constraint;
identify a first device that is capable of determining a geographic location of the first device, wherein the first device is physically separate from the apparatus;
in response to identifying the first device that is capable of determining the geographic location of the first device, determine that the first device is within a predefined proximity of the apparatus, wherein the predefined proximity defines a boundary outside of which devices are not authorized to receive the geographic location of the second device; and
in response to determining that the first device is within the predefined proximity:
request location information from the first device;
receive the requested location information from the first device, the location information including the geographic location of the first device;
determine whether the requested location information satisfies the geographic constraint associated with the protected content; and
enabling access to the protected content in response to determining that the requested location information satisfies the geographic constraint.

15. The apparatus of claim 14, wherein determining that the first device is within a predefined proximity of the apparatus includes determining a round trip transmission time between the apparatus and the first device; and wherein the predefined proximity of the apparatus is based on the round trip transmission time of data between the first device and the second device.

16. The apparatus of claim 14, wherein requesting location information from the first device includes transmitting a template including data that specifies at least one of: a format and a protocol for sending the requested location information.

17. The apparatus of claim 14, wherein the apparatus is a Content Protection and Copyright Management (CPCM) compliant device.

18. The apparatus of claim 14, wherein the predefined proximity includes a predefined physical distance.

19. The apparatus of claim 14, wherein the request for the location information includes a specification of a geographic location format.

20. The apparatus of claim 14, wherein the location information received from the first device includes a timestamp and a period of validity of the location information.

21. The apparatus of claim 19, wherein the response from the first device includes an error code indicating that the geographic location format is unsupported.

22. The apparatus of claim 14, the memory further comprising instructions for establishing a secure authentication channel (SAC) between the apparatus and the first device upon determining that the first device is capable of determining its own geographic location.

23. The apparatus of claim 22, wherein at least one of the request and the response is authenticated using a SAC authentication key corresponding to the SAC.

24. The apparatus of claim 14, the memory further storing computer readable instructions that, when executed by the at least one processor, cause the apparatus to:
in response to determining that the apparatus is not within the predefined proximity of the first device, identify a second device physically separate from the apparatus and the first device, that is capable of determining a geographic location of the second device.

25. The apparatus of claim 14, wherein determining whether the location information satisfies the geographic constraint includes determining whether the geographic location of the first device satisfies the geographic constraint.

26. The apparatus of claim 14, wherein the requested geographic information is received as a content file discoverable using a content discovery protocol.

27. One or more non-transitory computer readable media storing computer readable instructions that, when executed, cause an apparatus to:
receive content protected by a geographic constraint;
identify a first device that is capable of determining a geographic location of the first device, wherein the first device is physically separate from the apparatus;
in response to identifying the first device that is capable of determining the geographic location of the first device, determine that the first device is within a predefined proximity of the apparatus, wherein the predefined proximity defines a boundary outside of which devices are not authorized to receive the geographic location of the second device; and
in response to determining that the first device is within the predefined proximity:
request location information from the first device;
receive the requested location information from the first device, the location information including the geographic location of the first device;

determine whether the requested location information satisfies the geographic constraint associated with the protected content; and enabling access to the protected content in response to determining that the requested location information satisfies the geographic constraint.

28. The one or more computer readable media of claim 27, further storing computer readable instructions that, when executed, cause an apparatus to:

in response to determining that the apparatus is not within the predefined proximity of the first device, identify a second device different from the apparatus and the first device, that is capable of determining a geographic location of the second device.

29. The one or more computer readable media of claim 27, wherein determining whether the location information satisfies the geographic constraint includes determining whether the geographic location of the first device satisfies the geographic constraint.

30. The method of claim 1, wherein enabling access to the protected content includes unlocking the protected content.

31. The method of claim 1, further comprising determining whether the location information is valid based on whether the first device has been stationary since the requested location information was received from the second device.

* * * * *